United States Patent Office 3,819,626
Patented June 25, 1974

3,819,626
SUBSTITUTED TRIAZINES
John W. Kobzina, Walnut Creek, Calif., assignor to Chevron Research Company, San Francisco, Calif.
No Drawing. Filed Sept. 11, 1972, Ser. No. 288,245
Int. Cl. C07d 55/20
U.S. Cl. 260—249.8
9 Claims

ABSTRACT OF THE DISCLOSURE

Triazines of the formula

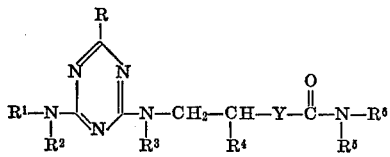

wherein R is chlorine, methoxy or methylthio; $R^1$ is alkyl, alkenyl or alkoxyalkyl; $R^2$, $R^3$, $R^4$ and $R^5$ are hydrogen or alkyl; $R^6$ is alkyl, aryl or haloaryl; and Y is oxygen or sulfur, are useful as herbicides.

BACKGROUND OF THE INVENTION

The present invention is directed to carbamyloxyalkylamino- and carbamylthioalkylamino-1,3,5-triazines and their use as herbicides.

Triazines and certain derivatives thereof are known to have utility in a variety of areas, such as fungicides and herbicides. For example, U.S. Pat. No. 2,891,855, issued June 23, 1959 to Gysin et al. and British Pat. No. 814,947, published June 17, 1959, disclose certain diamino-substituted 1,3,5-triazines and their use as herbicides.

DESCRIPTION OF THE INVENTION

The novel carbamyloxy- and carbamylthio-substituted triazines of the invention are represented by the formula

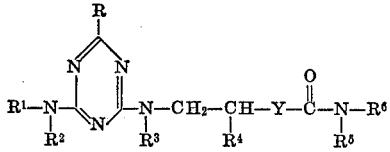

wherein R is chlorine, methoxy or methylthio; $R^1$ is alkyl of from 1 to 6 carbon atoms, alkenyl of 3 to 6 carbon atoms, or alkoxyalkyl of 2 to 6 carbon atoms; $R^2$, $R^3$, $R^4$ and $R^5$ are hydrogen or alkyl of 1 to 6 carbon atoms; $R^6$ is alkyl of 1 to 6 carbon atoms, aryl of 6 to 10 carbon atoms substituted with up to 3 (0 to 3) fluorine, chlorine or bromine atoms; and Y is oxygen or sulfur.

With reference to formula (I) and as used herein, the term "carbamyloxy" refers to the functional group

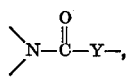

wherein Y is oxygen and the term "carbamylthio" refers to the functional group

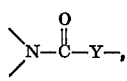

wherein Y is sulfur.

Representative alkyl groups which $R^1$, $R^2$, $R^3$, $R^4$, $R^5$ and $R^6$ may represent include methyl, ethyl, n-propyl, isopropyl, n-butyl, sec-butyl, t-butyl, n-pentyl, isohexyl, n-hexyl, etc.

Representative alkenyl groups which $R^1$ may represent include allyl, 2-butenyl, 2-pentenyl, 2-methyl-2-pentenyl, 3-hexenyl, etc.

Representative alkoxyalkyl groups which $R^1$ may represent include methoxymethyl, 2-methoxyethyl, 3-methoxypropyl, ethoxymethyl, 2-ethoxyethyl, 3-ethoxypropyl, butoxymethyl, etc.

Representative monocarbocyclic aryl groups which $R^6$ may represent include phenyl, alkylphenyl groups of 7 to 10 carbon atoms such as p-tolyl, o-tolyl, xylyl, 2,4-diethylphenyl, and o-isopropylphenyl; phenylalkyl groups of 7 to 10 carbon atoms such as benzyl, 2-phenylethyl and 3-o-tolylphenyl; halophenyl such as o-fluorophenyl, o,p-difluorophenyl, o-chlorophenyl, p-chlorophenyl, m,p-dichlorophenyl, o-bromophenyl, m-bromophenyl, m-bromo-p-chlorophenyl; and haloalkylphenyl and halophenylalkyl groups of 7 to 10 carbon atoms such as o-chloro-p-methylphenyl, o - fluoro - p - methylphenyl, o-methyl-p-chlorophenyl, m - chloro - m - methylphenyl; p-chlorobenzyl, o-fluorobenzyl and 3-(p-bromophenyl) propyl.

Preferred $R^1$ groups are alkyl and alkoxyalkyl groups, especially isopropyl and 3-methoxypropyl.

Preferred $R^2$, $R^3$, $R^4$, and $R^5$ groups are hydrogen and methyl. The particularly preferred $R^2$, $R^3$, $R^4$ and $R^5$ group is hydrogen.

Preferred $R^6$ groups are alkyl and phenyl substituted with 1 to 2 fluorine and chlorine atoms. Particularly preferred $R^6$ groups are alkyl of 1 to 3 carbon atoms, especially methyl.

Illustrative s-triazines of formula (I) wherein Y is sulfur include 2-chloro-4-methylamino-6-(2-[methylcarbamylthio] ethylamino)-s-triazine,
2-chloro-4-ethylamino-6-(2-[ethylcarbamylthio]ethylamino)-s-triazine,
2-chloro-4-isopropylamino-6-(2-[methylcarbamylthio] ethylamino)-s-triazine,
2-chloro-4-isopropylamino-6-(2-[ethylcarbamylthio] ethylamino)-s-triazine,
2-chloro-4-isopropylamino-6-(2-[n-propylcarbamylthio] ethylamino)-s-triazine,
2-chloro-4-isopropylamino-6-(2-[hexylcarbamylthio] ethylamino)-s-triazine,
2-chloro-4-n-butylamino-6-(2-[methylcarbamylthio] ethylamino)-s-triazine,
2-chloro-4-isopropylamino-6-(2-[methylcarbamylthio] ethylamino)-s-triazine,
2-chloro-4-isopropylamino-6-(2-[dimethylcarbamylthio] ethylamino)-s-triazine,
2-chloro-4-isopropylamino-6-(2-[diethylcarbamylthio] ethylamino)-s-triazine,
2-chloro-4-isopropylamino-6-(2-[phenylcarbamylthio] ethylamino)-s-triazine,
2-chloro-4-isopropylamino-6-(2-[o-fluorophenylcarbamylthio]ethlamino)-s-triazine,
2-chloro-4-propylamino-6-(2-[p-chlorophenylcarbamylthio]ethylamino)-s-triazine, 2-chloro-4-dimethylamino-6-(2-[p-tolylcarbamylthio]-ethylamino)-s-triazine,
2-chloro-4-diisopropylamino-6-(2-[o,p-difluorophenylcarbamylthio]ethylamino)-s-triazine,
2-chloro-4-isopropylamino-6-(2-[benzylcarbamylthio] ethylamino)-s-triazine,
2-chloro-4-methylethylamino-6-(2-[methylcarbamylthio] ethylamino)-s-triazine,
2-chloro-4-allylamino-6-(2-[methylcarbamylthio]ethylamino)-2-triazine,
2-chloro-4-(2-butenylamino)-6-(2-[methylcarbamylthio] ethylamino)-s-triazine,
2-chloro-4-allylamino-6-(2-[o-chlorophenylcarbamylthio] ethylamino)-s-triazine, 2-chloro-4-(methoxymethyl)amino-6-(2-[hexylcarbamyl-thio]ethylamino)-s-triazine,
2-chloro-4-(2-methoxyethylamino)-6-(2-[isopropylcarb-amylthio]ethylamino)-s-triazine,
2-chloro-4-(3-methoxypropylamino)-6-(2-[methylcarb-amylthio]ethylamino)-s-triazine,
2-chloro-4-(3-methoxypropylamino)-6-(2-[ethylcarb-amylthio]ethylamino)-s-triazine,
2-chloro-4-(3-methoxypropylamino)-6-(2-[phenylcarb-amylthio]ethylamino)-s-triazine,
2-chloro-4-(3-methoxypropylamino)-6-[2-o-tolylcarb-amylthio]ethylamino)-s-triazine,
2-chloro-4-(3-methoxypropylamino)-6-(2-[benzylcarb-amylthio]ethylamino)-s-triazine,
2-methoxy-4-isopropylamino-6-(2-[methylcarbamylthio]ethylamino)-s-triazine,
2-methoxy-4-isopropylamino-6-(2-[ethylcarbamylthio]ethylamino)-s-triazine,
2-methoxy-4-dimethylamino-6-(2-[m-chlorophenylcarb-amylthio]ethylamino)-s-triazine,
2-methoxy-4-(methoxymethyl)amino-6-(2-[phenylcarb-amylthio]ethylamino)-s-triazine,
2-methoxy-4-(2-methoxypropylamino)-6-(2-[methyl-carbamylthio]ethylamino)-s-triazine,
2-methoxy-4-allylamino-6-(2-[methylcarbamylthio]eth-ylamino)-s-triazine,
2-methoxy-4-(methoxymethyl)isopropylamino-6-(2-[methylcarbamylthio]ethylamino)-s-triazine,
2-methoxy-4-isobutylamino-6-(2-[methylcarbamylthio]ethylamino)-s-triazine,
2-methoxy-4-hexylamino-6-(2-[dimethylcarbamylthio]ethylamino)-s-triazine,
2-methoxy-4-isopropylamino-6-(2-[benzylcarbamylthio]ethylamino)-s-triazine,
2-methylthio-4-isopropylamino-6-(2-methylcarbamylthio]ethylamino)-s-triazine,
2-methylthio-4-allylamino-6-(2-[ethylcarbamylthio]ethylamino)-s-triazine,
2-methylthio-4-(methoxymethyl)amino-6-(2-[phenyl-carbamylthio]ethylamino)-s-triazine,
2-methylthio-4-dimethylamino-6-(2-[o-fluorophenylcarb-amylthio]ethylamino)-s-triazine,
2-methylthio-4-allylmethylamino-6-(2-[methylcarbamyl-thio]ethylamino)-s-triazine,
2-methylthio-4-isopropylamino-6-(2-[dimethylcarbamyl-thio]ethylamino)-s-triazine,
2-chloro-4-isopropylamino-6-(2-[methylcarbamylthio]propylamino)-s-triazine,
2-methoxy-4-isopropylamino-6-(2-methylcarbamylthio]propylamino)-s-triazine,
2-methylthio-4-isopropylamino-6-(2-[phenylcarbamyl-thio]propylamino)-s-triazine,
2-chloro-4-allylamino-6-(2-[o-bromophenylcarbamyl-thio]propylamino)-s-triazine,
2-chloro-4-ethylamino-6-(2-[benzylcarbamylthio]propylamino)-s-triazine,
2-chloro-4-isopropylamino-6-methyl(2-[methylcarbamyl-thio]ethylamino)-s-triazine,
2-methoxy-4-allylamino-6-methyl(2-[o-chlorophenylcarb-amylthio]ethylamino-s-triazine,
2-methylthio-4-(methoxymethyl)amino-6-methyl(2-[di-methylcarbamylthio]ethylamino-s-triazine, and
2-methylthio-4-isopropylamino-6-methyl(2-[p-chloro-benzylcarbamylthio]ethylamino-s-triazine.

Illustrative s-triazines of formula (I) wherein Y is oxygen include
2-chloro-4-methylamino-6-(2-[methylcarbamyloxy]ethylamino)-s-triazine,
2-chloro-4-ethylamino-6-(2-[ethylcarbamyloxy]ethylamino)-s-triazine,
2-chloro-4-isopropylamino-6-(2-methylcar-bamyloxy]ethylamino)-s-triazine,
2-chloro-4-isopropylamino-6-(2-[ethylcarbamyloxy]ethylamino)-s-triazine,
2-chloro-4-isopropylamino-6-(2-[n-propyl-carbamyloxy]ethylamino)-s-triazine,
2-chloro-4-isopropylamino-6-(2-[hexylcarbamyloxy]ethylamino)-s-triazine,
2-chloro-4-n-butylamino-6-(2-[methylcarbamyloxy]ethylamino)-s-triazine,
2-chloro-4-isopropylamino-6-(2-[methylcarbamyloxy]ethylamino)-s-triazine,
2-chloro-4-isopropylamino-6-(2-[dimethy-carbamyloxy]ethylamino)-s-triazine,
2-chloro-4-isopropylamino-6-(2-[diethyl-carbamyloxy]ethylamino)-s-triazine,
2-chloro-4-isopropylamino-6-(2-[phenylcarbamyloxy]ethylamino)-s-triazine,
2-chloro-4-isopropylamino-6-(2-[o-fluorophenyl-carbamyloxy]ethylamino)-s-triazine,
2-chloro-4-propylamino-6-(2-[p-chlorophenyl-carbamyloxy]ethylamino)-s-triazine,
2-chloro-4-dimethylamino-6-(2-[p-tolylcarbamyloxy]ethylamino)-s-triazine,
2-chloro-4-diisopropylamino-6-(2-[o,p-difluorophenyl-carbamyloxy]ethylamino)-s-triazine,
2-chloro-4-isopropylamino-6-(2-[benzylcarbamyloxy]ethylamino)-s-triazine,
2-chloro-4-methylethylamino-6-(2-[methylcar-bamyloxy]ethylamino)-s-triazine,
2-chloro-4-allylamino-6-(2-[methylcarbamyloxy]ethylamino)-2-triazine,
2-chloro-4-(2-butenylamino)-6-(2-[methylcarbamyloxy]ethylamino)-s-triazine,
2-chloro-4-allylamino-6-(2-[o-chlorophenyl-carbamyloxy]ethylamino-s-triazine,
2-chloro-4-(methoxymethyl)amino-6-(2-[hexylcarbamyl-oxy]ethylamino)-s-triazine,
2-chloro-4-(2-methoxyethylamino)-6-(2-[isopropyl-carbamyloxy]ethylamino)-s-triazine,
2-chloro-4-(3-methoxypropylamino)-6-(2-[methyl-carbamyloxy]ethylamino)-s-triazine,
2-chloro-4-(3-methoxypropylamino)-6-(2-[ethyl-carbamyloxy]ethylamino)-s-triazine,
2-chloro-4-(3-methoxypropylamino)-6-(2-[phenyl-carbamyloxy]ethylamino)-s-triazine,
2-chloro-4-(3-methoxypropylamino)-6-[2-o-tolyl-carbamyloxy]ethylamino)-s-triazine,
2-chloro-4-(3-methoxypropylamino)-6-(2-[benzyl-carbamyloxy]ethylamino)-s-triazine,
2-methoxy-4-isopropylamino-6-(2-[methylcarbamyloxy]ethylamino)-s-triazine,
2-methoxy-4-isopropylamino-6-(2-[ethylcarbamyloxy]ethylamino)-s-triazine,
2-methoxy-4-dimethylamino-6-(2-[m-chlorophenyl-carbamyloxy]ethylamino)-s-triazine,
2-methoxy-4-(methoxymethyl)amino-6-(2-[phenyl-carbamyloxy]ethylamino)-s-triazine,
2-methoxy-4-(2-methoxypropylamino)-6-(2-[methyl-carbamyloxy]ethylamino)-s-triazine,
2-methoxy-4-allylamino-6-(2-[methylcarbamyloxy]ethylamino)-s-triazine,
2-methoxy-4-(methoxymethyl)isopropylamino-6-(2-[methylcarbamyloxy]ethylamino)-s-triazine,
2-methoxy-4-isobutylamino-6-(2-[methylcarbamyloxy]ethylamino)-s-triazine,
2-methoxy-4-hexylamino-6-(2-[dimethylcarbamyloxy]ethylamino)-s-triazine,
2-methoxy-4-isopropylamino-6-(2-[benzylcarbamyloxy]ethylamino)-s-triazine,
2-methylthio-4-isopropylamino-6-(2-[methyl-carbamyloxy]ethylamino)-s-triazine,
2-methylthio-4-allylamino-6-(2-[ethylcarbamyloxy]ethylamino)-s-triazine,
2-methylthio-4-(methoxymethyl)amino-6-(2-[phenyl-carbamyloxy]ethylamino)-s-triazine,
2-methylthio-4-dimethylamino-6-(2-[o-fluorophenyl-carbamyloxy]ethylamino)-s-triazine, 2-methylthio-4-allylmethylamino-6-(2-[methyl-
    carbamyloxy]ethylamino)-s-triazine,
2-methylthio-4-isopropylamino-6-(2-[dimethyl-
    carbamyloxy]ethylamino)-s-triazine,
2-chloro-4-isopropylamino-6-(2-[methyl-
    carbamyloxy]propylamino-s-triazine,
2-methoxy-4-isopropylamino-6-(2-[methyl-
    carbamyloxy]propylamino)-s-triazine,
2-methylthio-4-isopropylamino-6-(2-[phenyl-
    carbamyloxy]propylamino)-s-triazine,
2-chloro-4-allylamino-6-(2-[o-bromophenyl-
    carbamylthio]propylamino)-s-triazine,
2-chloro-4-ethylamino-6-(2-[benzylcarbamyloxy]
    propylamino)-s-triazine,
2-chloro-4-isopropylamino-6-methyl-(2-[methyl-
    carbamyloxy]ethylamino)-s-triazine,
2-methoxy-4-allylamino-6-methyl-(2-[o-chlorophenyl-
    carbamyloxy]ethylamino-s-triazine,
2-methylthio-4-(methoxymethyl)amino-6-methyl-(2-
    [dimethylcarbamyloxy]ethylamino-s-triazine, and
2-methylthio-4-isopropylamino-6-methyl-(2-[p-chloro-
    benzylcarbamyloxy]ethylamino-s-triazine.

The preferred triazines of the invention are those wherein Y is sulfur, R is chloro, $R^1$ is isopropyl or 3-methoxypropyl, $R^6$ is methyl and $R^2$, $R^3$, $R^4$ and $R^5$ are hydrogen.

The compounds of the invention may be prepared by the reaction of a chloro-s-triazine (III) and a carbamyloxy- or carbamylthio-substituted amine (II), according to the following equation (1).

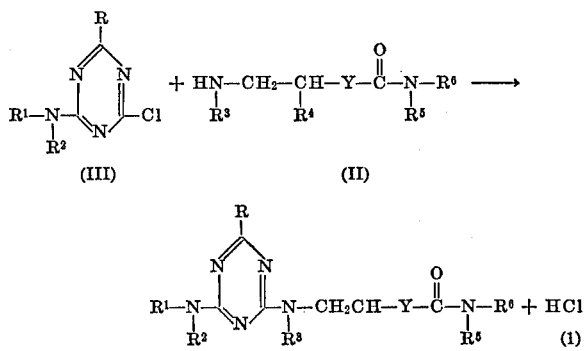

wherein R, $R^1$, $R^2$, $R^3$, $R^4$, $R^5$, $R^6$ and Y have the same significance as previously defined. This reaction is conducted by contacting substantially equimolar amounts of the chloro-s-triazine (III) and the amine (II) in an inert solvent, e.g., chlorobenzene, at 25° C. to 100° C. A strong base, e.g., sodium hydroxide, is employed to neutralize the hydrochloric acid formed in the reaction and to maintain the reaction media neutral or slightly basic, e.g., pH 7–9.

In a modification of the reaction, the hydrochloride salt of the amine (II) is provided to the reaction mixture and the free amine (II) is generated by the addition of an equimolar amount of a strong inorganic base, e.g., sodium hydroxide. The product is isolated by conventional procedures, e.g., filtration, extraction, chromatography, etc.

The hydrochloride salt of the amine (II) is prepared by conventional procedures from a hydroxy- or mercapto-amine hydrochloride (IV) and a carbamyl chloride (V), according to the following equation (2).

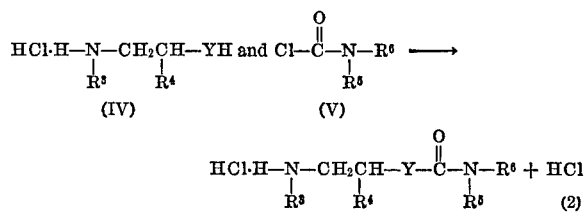

The hydrochloride salt is then converted to the amine (II).

Alternatively, the compounds of the invention may be prepared by the reaction of a carbamyl chloride (V) and a hydroxy- or mercapto-alkylamino-s-triazine (VI), according to the following equation (3).

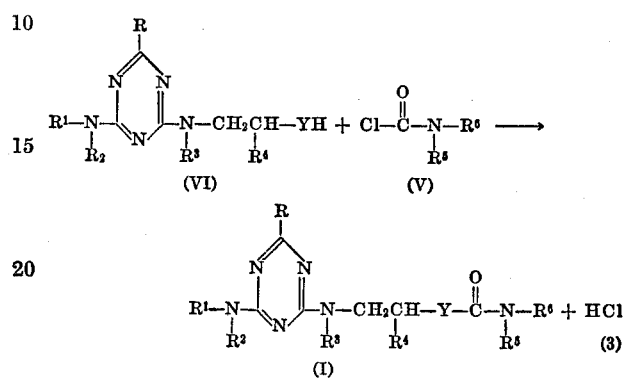

wherein R, $R^1$, $R^2$, $R^3$, $R^4$, $R^5$, $R^6$ and Y have the same significance as previously defined. This reaction is conducted by contacting substantially equimolar amounts of the triazine (VI) and the carbamyl chloride (V) in the presence of a base, e.g., inorganic bases such as sodium methoxide or organic bases such as triethylamine or pyridine, in an invert solvent at a temperature of 25° C. to 100° C. The product is then isolated by conventional procedures, e.g., extraction, filtration, chromatography, etc.

The compounds of the invention wherein $R^5$ is hydrogen may also be prepared by the reaction of an isocyanate (VII) and a hydroxy- or mercapto-alkylamino-s-triazine (VI), according to the following equation (4).

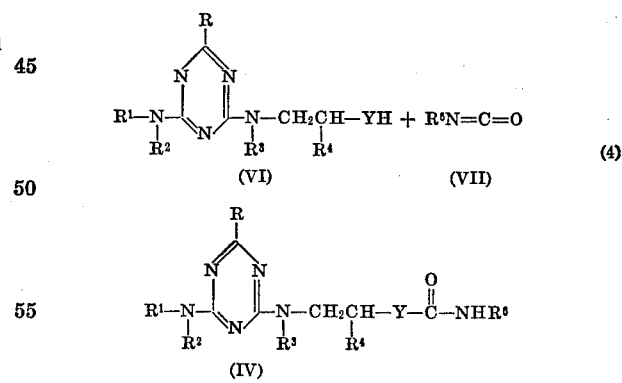

wherein R, $R^1$, $R^2$, $R^3$, $R^4$, $R^6$ and Y have the same significance as previously defined. This reaction is conducted by conventional procedures. Generally, equimolar amounts of the triazine (VI) and the isocyanate (VII) are used. A small amount of an organic base, e.g., triethylamine, may be employed as a catalyst. The reaction is generally conducted in the presence of an inert solvent, e.g., dimethoxyethane, methylene dichloride or benzene. The reaction temperature suitably ranges from 0° C. to 100° C. and the reaction time from ½ to 72 hours. The crude product may be purified by recrystallization or chromatography.

The preparation of the triazines of the invention is exemplified by the following examples.

EXAMPLE 1

2-Chloro-4-Isopropylamino-6-(2-[Methylcarbamylthio]Ethylamino)-s-Triazine

A solution of 5 g. 2-chloro-4-isopropylamino-6-(2-mercaptoethylamino)-2-triazine, 1.38 g. methyl isocyanate and 10 drops triethylamine in 20 ml. benzene was heated at 100° C. for 2 hours and then allowed to cool overnight. The product was filtered and dried. The melting point and elemental analysis is tabulated in Table I.

EXAMPLE 2

2-Chloro-4-(3-Methoxypropylamino)-6-(2-[Methylcarbamyloxy]Ethylamino)-s-Triazine A solution of 5 g. 2-chloro-4-(3-methoxypropylamino)-6-(2-hydroxyethylamino)-s-triazine, 1.2 g. methyl isocyanate and 10 drops triethylamine in 20 ml. dimethylformamide was heated at 100° C. for 2 hours. The dimethylformamide was removed by distillation and the resulting residue was slurried with ether and filtered to give the product as a white powder. The melting point and elemental analysis on the product is tabulaed in Table I.

EXAMPLE 3

2-Methoxy-4-Isopropylamino-6-(2-[o-Fluorophenylcarbamyloxy]Ethylamino)-s-Triazine A solution of 5 g. 2-methoxy-4-isopropylamino-6-(2-hydroxyethylamino)-s-triazine, 3.0 g. o-fluorophenyl isocyanate and 10 drops triethylamine was stirred at 25° C. for about 2 days. The reaction mixture was filtered to give the product. The melting point and elemental analysis on the product is tabulated in Table I.

EXAMPLE 4

2-Chloro-4-Ethylamino-6-(2-[Methylcarbamylthio]Ethylamino)-s-Triazine

A solution of 2.25 g. ethylamine in 5 ml. water was mixed with a solution of 9.22 g. cyanuric chloride in 80 ml. chlorobenzene at about 0° C. A solution of 2 g. sodium hydroxide in 5 ml. water was added and the reaction mixture stirred at 0° C. for 1.5 hours.

To the unisolated 2,6-dichloro-4-ethylamino-s-triazine, prepared above, was added a solution of 8.53 g. 2-(methylcarbamylthio)-ethylamine hydrochloride in 15 ml. water followed by a solution of 2 g. sodium hydroxide in 5 ml. of water. The reaction mixture was then warmed to 50° C. and an additional 2 g. sodium hydroxide in 5 ml. water was added dropwise at a rate sufficient to maintain the reaction slightly basic. After the addition was completed, the reaction mixture was stirred at 50° C. for 0.5 hour. The crude product was isolated by filtration, slurried with warm water and filtered, and dried. The melting point and elemental analysis of the product is tabulated in Table I.

EXAMPLE 5

2-Chloro-4-Isopropylamino-6-(2-Mercaptoethylamino)-s-Triazine

A solution of 5.91 g. isopropylamine in 6 ml. water was added dropwise to 18.44 g. cyanuric chloride in 80 ml. chlorobenzene at 0 to —5° C. A solution of 4 g. sodium hydroxide in 10 ml. water was added and the reaction mixture stirred at 0° C. for 1 hour.

To the unisolated 2,6-dichloro-4-isopropylamino-s-triazine, prepared above, was added a solution of 11.36 g. 2-mercaptoethylamine hydrochloride in 30 ml. water followed by a solution of 4 g. sodium hydroxide in 10 ml. water. The reaction mixture was then warmed to 50° C. and an additional 4 g. sodium hydroxide in 10 ml. water was added. The reaction mixture (slightly basic) was stirred at 50° C. for 0.5 hour and at about 25° C. overnight. The chlorobenzene layer was separated. The aqueous layer was extracted with benzene. The combined organic solutions were dried over magnesium sulfate and evaporated under reduced pressure to give the crude product. Recrystallization from ether gave the product as a white solid, m.p. 141–146° C.

Elemental analysis showed: Calc. (percent): S, 12.9; Cl, 14.3. Found (percent): S, 12.7; Cl, 14.7.

The product is an example of a mercapto-alkylamine-s-triazine represented by formula (VI) wherein Y is sulfur. In addition to being intermediates for the preparation of the compounds of the invention, these novel mercaptoalkylamino-s-triazine are useful as herbicides. The herbicidal activity of the product of this example is provided in Table II, 18th compound.

EXAMPLE 6

2-Chloro-4-Isopropylamino-6-(2-[Dimethylcarbamylthio]Ethylamino)-s-Triazine

A 0.46 g. sample of sodium was added to 50 ml. methanol in small pieces. To the resulting sodium methoxide solution was added 5 g. 2-chloro-4-isopropylamino-6-(2-mercaptoethylamino)-s-triazine, followed by 2.16 g. dimethylcarbamyl chloride at 0° C. The reaction mixture was heated at 80° C. for 4 hours, cooled, filtered and evaporated under reduced pressure to give a yellow oil. The yellow oil was dissolved in 1:1 ether/acetone and filtered. The filtrate was evaporated to give the product as an oil. The elemental analysis on the product is tabulated in Table I.

Other compounds of the invention were prepared by the procedures of Examples 1–6 and are tabulated in Table I.

TABLE I.—PHYSICAL PROPERTIES AND ELEMENTAL ANALYSIS FOR COMPOUNDS OF THE FORMULA

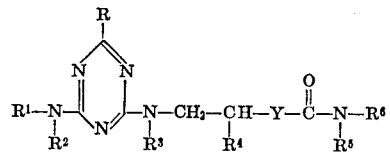

| R | R¹ | R² | R³ | R⁴ | R⁵ | R⁶ | Y | Melting point, °C. | Nitrogen Calcd. | Nitrogen Found | Chlorine Calcd. | Chlorine Found |
|---|---|---|---|---|---|---|---|---|---|---|---|---|
| $CH_3O$ | $C_2H_5$ | H | H | H | H | $CH_3$ | O | ---------- | 31.1 | 29.1 | | |
| Cl | $CH_3$ | $CH_3$ | H | H | H | $CH_3$ | O | 162–164 | 30.6 | 30.0 | 12.9 | 12.7 |
| Cl | $CH_3$ | $CH_3$ | H | H | H | $\phi$* | O | 178–181 | 25.0 | 23.6 | 10.5 | 10.5 |
| Cl | $CH_3$ | $CH_3$ | H | H | H | p-Cl-$\phi$ | O | 201–204 | 22.6 | 21.0 | 19.1 | 19.5 |
| Cl | $CH_3$ | $CH_3$ | H | H | H | o-F-$\phi$ | O | 167–170 | 23.7 | 23.8 | 10.0 | 9.9 |
| $CH_3O$ | $C_2H_5$ | H | H | H | H | $\phi$ | O | 122–124 | 25.3 | 25.7 | | |
| $CH_3O$ | $C_2H_5$ | H | H | H | H | p-Cl-$\phi$ | O | 137–139 | 22.9 | 23.1 | | |
| $CH_3O$ | $C_2H_5$ | H | H | H | H | o-F-$\phi$ | O | 118–120 | 24.0 | 23.9 | | |
| Cl | $C_2H_5$ | H | H | H | H | $\phi$ | O | 190–194 | 25 | 24.7 | | |
| Cl | $C_2H_5$ | H | H | H | H | p-F-$\phi$ | O | 200–204 | ---------- | | 19.1 | 19.3 |
| Cl | $C_2H_5$ | H | H | H | H | $CH_3$ | O | 181–184 | 30.6 | 29.8 | | |
| Cl | $C_2H_5$ | H | H | H | H | p-F-$\phi$ | O | 185–188 | 23.7 | 23.8 | | |
| $CH_3O$ | $(CH_3)_2CH$ | H | H | H | H | $\phi$ | O | 70–73 | 24.3 | 22.4 | | |
| $CH_3O$ | $C_2H_5$ | H | H | H | H | $CH_3$ | O | Oil | 27.4 | 26.8 | | |
| $CH_3O$ | $(CH_3)_2CH$ | H | H | H | H | $CH_3$ | O | Oil | 29.6 | 28.7 | | |

TABLE I.—PHYSICAL PROPERTIES AND ELEMENTAL ANALYSIS FOR COMPOUNDS OF THE FORMULA

| | | | | | | | | | Elemental analysis | | | |
|---|---|---|---|---|---|---|---|---|---|---|---|---|
| | | | | | | | | Melting | Nitrogen | | Chlorine | |
| R | R$^1$ | R$^2$ | R$^3$ | R$^4$ | R$^5$ | R$^6$ | Y | point, °C. | Calcd. | Found | Calcd. | Found |
| CH$_3$O | (CH$_3$)$_2$CH | H | H | H | H | p-Cl-φ | O | 107–108 | | | 9.3 | 9.6 |
| CH$_3$O | (CH$_3$)$_2$CH | H | H | H | H | o-F-φ | O | 68–70 | 23.1 | 20.8 | | |
| Cl | (CH$_3$)$_2$CH | H | H | H | H | CH$_3$ | O | 141–144 | | | 11.6 | 11.7 |
| Cl | (CH$_3$)$_2$CH | H | H | H | H | o-Cl-φ | O | 130–132 | | | 17.7 | 18.8 |
| Cl | (CH$_3$)$_2$CH | H | H | H | H | o-Cl-φ | O | 191–193 | | | 17.8 | 17.8 |
| Cl | (CH$_3$)$_2$CH | H | H | CH$_3$ | H | CH$_3$ | O | 114–116 | | | 11.7 | 11.5 |
| CH$_3$O | (CH$_3$)$_2$CH | H | H | CH$_3$ | H | p-Cl-φ | O | 50–55 | | | 9.0 | 9.1 |
| CH$_3$O | (CH$_3$)$_2$CH | H | H | CH$_3$ | H | CH$_3$ | O | 57–63 | 28.2 | 24.6 | | |
| Cl | (CH$_3$)$_2$CH | H | CH$_3$ | H | H | p-Cl-φ | O | 45–50 | | | 17.8 | 17.7 |
| CH$_3$O | (CH$_3$)$_2$CH | H | CH$_3$ | H | H | CH$_3$ | O | Oil | 28.2 | 25.6 | | |
| CH$_3$O | (CH$_3$)$_2$CH | H | CH$_3$ | H | H | p-Cl-φ | O | | | | 9.0 | 8.4 |
| Cl | (CH$_3$)$_2$CH | H | H | H | H | CH$_3$ | O | 78–85 | | | 13.0 | 14.0 |
| Cl | CH$_3$O(CH$_2$)$_3$ | H | H | H | H | CH$_3$ | O | 155–158 | | | 11.1 | 10.5 |
| Cl | CH$_3$O(CH$_2$)$_2$ | H | H | H | H | CH$_3$ | O | 154–158 | | | 11.6 | 12.3 |
| Cl | CH$_2$=CHCH$_2$ | H | H | H | H | CH$_3$ | O | 163–170 | | | 12.4 | 11.3 |
| Cl | C$_2$H$_5$ | H | H | H | H | CH$_3$CH$_2$CH$_2$ | S | 182–187 | | | 12.2 | 12.6 |
| Cl | (CH$_3$)$_2$CH | H | H | H | H | CH$_3$CH$_2$CH$_2$ | S | 139–141 | | | 11.1 | 10.9 |
| Cl | CH$_2$=CHCH$_2$ | H | H | H | H | CH$_3$CH$_2$CH$_2$ | S | 189–203 | | | 11.7 | 11.2 |
| Cl | CH$_3$O(CH$_2$)$_3$ | H | H | H | H | CH$_3$CH$_2$CH$_2$ | S | 154–156 | | | 10.6 | 10.7 |
| Cl | CH$_3$(CH$_2$)$_3$ | H | H | H | H | CH$_3$ | S | 181–184 | | | 11.1 | 11.4 |
| Cl | CH$_3$OCH$_2$ | CH$_3$ | H | H | H | CH$_3$ | S | Oil | | | 10.6 | 11.2 |
| Cl | (CH$_3$)$_2$CH | CH$_3$ | H | H | H | CH$_3$CH$_2$ | S | 113–115 | | | 10.7 | 10.7 |
| Cl | (CH$_3$)$_2$CH | CH$_3$ | H | H | H | φ | S | 126–130 | | | 9.7 | 9.5 |
| Cl | (CH$_3$)$_2$CH | CH$_3$ | H | H | H | φ | S | 161–166 | | | 8.9 | 8.9 |
| Cl | C$_2$H$_5$ | H | H | H | H | CH$_3$ | S | 163–168 | | | 12.2 | 12.4 |
| Cl | C$_2$H$_5$ | C$_2$H$_5$ | H | H | H | CH$_3$ | S | 165–170 | | | 11.1 | 11.0 |
| Cl | CH$_2$=CHCH$_2$ | C$_2$H$_5$ | H | H | H | CH$_3$ | S | 192–195 | | | 11.7 | 12.9 |
| Cl | CH$_3$O(CH$_2$)$_3$ | C$_2$H$_5$ | H | H | H | CH$_3$ | S | 138–145 | | | 10.6 | 11.5 |
| Cl | CH$_3$(CH$_2$)$_3$ | C$_2$H$_5$ | H | H | H | CH$_3$ | S | 171–174 | | | 11.1 | 12.6 |
| Cl | (CH$_3$)$_2$CH | C$_2$H$_5$ | H | H | CH$_3$ | CH$_3$ | S | | | | 11.1 | 11.1 |
| Cl | (CH$_3$)$_2$CH | C$_2$H$_5$ | H | H | (CH$_3$)$_2$CH | (CH$_3$)$_2$CH | S | Oil | | | 9.5 | 9.0 |

*Represents phenyl.

UTILITY

The triazines of the present invention are, in general, herbicidal in both pre- and post-emergence applications. For pre-emergence control of undesirable vegetation these triazines will be applied in herbicidal quantities to the environment, e.g., soil infested with seeds and/or seedlings of such vegetation. Such application will inhibit the growth of or kill the seeds, germinating seeds and seedlings. For post-emergence applications the triazines of the present invention will be applied directly to the foliage and other plant parts. Generally they are effective against weed grasses as well as broadleaved weeds. Some may be selective with respect to type of application and/or type of weed.

Pre- and post-emergence herbicidal tests on representative triazines of this invention were made using the following methods:

Pre-Emergence Test

An acetone solution of the test triazines was prepared by mixing 750 mg. triazine, 220 mg. of a nonionic surfactant and 25 ml. of acetone. This solution was added to approximately 125 ml. of water containing 156 mg. of surfactant.

Seeds of the test vegetation were planted in a pot of soil and the triazine solution was sprayed uniformly onto the soil surface at a dose of 100 micrograms per cm.$^2$. The pot was watered and placed in a greenhouse at a temperature of about 80–85° F. The pot was watered intermittently and was observed for seedling emergence, health of emerging seedlings, etc. for a 3-week period. At the end of this period the herbicidal effectiveness of the triazine was rated based on the physiological observations. A 0 to 100 scale was used; 0 representing no phytotoxicity, 100 representing complete kill.

Post-Emergence Test

The test triazine was formulated in the same manner as described for the pre-emergence test. The concentration of the triazine in this formulation was 5000 p.p.m. This formulation was uniformly sprayed on the pot containing 24-day-old plants (approximately 15 to 25 plants per pot) at a dose of 100 micrograms per cm.$^2$. The pots were then placed in a greenhouse at a temperature of 80–85° F. and then watered intermittently at their bases as needed. The plants were observed periodically for phytotoxic effects and physiological and morphological responses to the treatment. After 3 weeks the herbicidal effectiveness of the triazine was rated based on these observations. A 0 to 100 scale was used; 0 representing no phytotoxicity, 100 representing complete kill. In Table II, the following abbreviations are used:

O=Wild Oats (*Avena fatua*)
W=Watergrass (*Echinochloa crusgalli*)
C=Crabgrass (*Digitaria sanguinalis*)
M=Mustard (*Brassica arvensis*)
P=Pigweed (*Amaranthus retroflexus*)
L=Lamb's-quarter (*Chenopodium album*)

TABLE II.—HERBICIDAL ACTIVITY FOR COMPOUNDS OF THE FORMULA

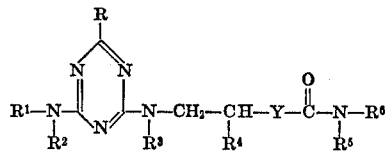

| | | | | | | | | Herbicidal effectiveness, pre-emergence/post-emergence | | | | | |
|---|---|---|---|---|---|---|---|---|---|---|---|---|---|
| R | R$^1$ | R$^2$ | R$^3$ | R$^4$ | R$^5$ | R$^6$ | Y | O | W | C | M | P | L |
| CH$_3$O | C$_2$H$_5$ | H | H | H | H | CH$_3$ | O | 100/100 | 95/100 | 100/95 | 100/100 | 100/100 | 100/100 |
| Cl | CH$_3$ | CH$_3$ | H | H | H | CH$_3$ | O | 30/10 | 30/10 | 45/10 | 90/80 | 95/55 | 95/55 |
| Cl | CH$_3$ | CH$_3$ | H | H | H | φ* | O | 20/ | 10/ | 20/ | 30/ | 85/15 | 75/20 |
| Cl | CH$_3$ | CH$_3$ | H | H | H | p-Cl-φ | O | 20/ | | | /20 | 25/45 | /70 |
| Cl | CH$_3$ | CH$_3$ | H | H | H | o-F-φ | O | /10 | /10 | /10 | /10 | /10 | |
| CH$_3$O | C$_2$H$_5$ | H | H | H | H | φ | O | 90/65 | 90/75 | 100/70 | 95/100 | 100/100 | 100/100 |
| CH$_3$O | C$_2$H$_5$ | H | H | H | H | p-Cl-φ | O | 80/85 | /80 | 25/80 | 65/100 | 75/100 | 100/100 |
| CH$_3$O | C$_2$H$_5$ | H | H | H | H | o-F-φ | O | 55/80 | 75/95 | 90/95 | 100/100 | 100/100 | 100/100 |
| Cl | C$_2$H$_5$ | H | H | H | H | φ | O | | | | 10/10 | 15/10 | 75/10 |

TABLE II—Continued

| R | R¹ | R² | R³ | R⁴ | R⁵ | R⁶ | Y | O | W | C | M | P | L |
|---|---|---|---|---|---|---|---|---|---|---|---|---|---|
| Cl | C₂H₅ | H | H | H | H | p-F-φ | O | 20/30 | 10/15 | 20/30 | 45/55 | 60/60 | 100/85 |
| Cl | C₂H₅ | H | H | H | H | CH₃ | O | 73/ | 80/10 | 98/10 | 99/64 | 100/88 | 100/97 |
| Cl | C₂H₅ | H | H | H | H | p-F-φ | O | /25 | | | 15/ | | 25/ |
| CH₃O | (CH₃)₂CH | H | H | H | H | φ | O | 10/100 | 25/65 | 40/73 | 98/100 | 95/100 | 100/100 |
| CH₃O | C₂H₅ | H | H | H | H | CH₃ | O | 35/25 | 30/25 | 20/30 | 95/100 | 75/85 | 85/100 |
| CH₃O | (CH₃)₂CH | H | H | H | H | CH₃ | O | 100/94 | 95/75 | 100/65 | 100/100 | 100/100 | 100/100 |
| CH₃O | (CH₃)₂CH | H | H | H | H | p-Cl-φ | O | 70/40 | 15/35 | 50/35 | 95/95 | 95/100 | 95/100 |
| CH₃O | (CH₃)₂CH | H | H | H | H | o-F-φ | O | 30/75 | 55/50 | 90/65 | 95/100 | 95/95 | 100/100 |
| Cl | (CH₃)₂CH | H | H | H | | | SH | 100/100 | 70/75 | 75/ | 100/100 | 100/100 | 100/100 |
| Cl | (CH₃)₂CH | H | H | H | H | CH₃ | S | 95/95 | 90/75 | 90/60 | 100/100 | 100/100 | 100/100 |
| Cl | (CH₃)₂CH | H | H | H | H | o-Cl-φ | O | | | | | /25 | |
| Cl | (CH₃)₂CH | H | H | H | H | o-Cl-φ | O | /10 | /10 | /10 | /50 | /50 | 30/40 |
| Cl | (CH₃)₂CH | H | H | CH₃ | H | CH₃ | O | 10/20 | 35/ | | 80/80 | 55/40 | 55/50 |
| CH₃O | (CH₃)₂CH | H | H | CH₃ | H | p-Cl-φ | O | 25/65 | 20/25 | 45/ | 95/100 | 65/75 | 85/85 |
| CH₃O | (CH₃)₂CH | H | H | CH₃ | H | CH₃ | O | 90/45 | 80/10 | 100/ | 95/50 | 100/55 | 100/75 |
| Cl | (CH₃)₂CH | H | CH₃ | H | H | p-Cl | O | 20/30 | /25 | /15 | 90/100 | 100/90 | 100/95 |
| Cl | (CH₃)₂CH | H | CH₃ | H | H | CH₃ | O | 55/10 | 75/ | 55/ | 100/65 | 100/60 | 100/70 |
| CH₃O | (CH₃)₂CH | H | CH₃ | H | H | CH₃ | O | | | | 15/ | 15/25 | 30/60 |
| CH₃O | (CH₃)₂CH | H | CH₃ | H | H | p-Cl | O | /90 | /50 | /25 | 15/95 | 90/90 | 90/100 |
| Cl | (CH₃)₂CH | H | H | H | H | CH₃ | O | /20 | | | 75/35 | 80/30 | 95/55 |
| Cl | CH₃O(CH₂)₃ | H | H | H | H | CH₃ | O | 100/10 | 30/ | 100/ | 100/100 | 100/80 | 100/70 |
| Cl | CH₃O(CH₂)₂ | H | H | H | H | CH₃ | O | 70/ | 10/ | 40/ | 95/ | 50/25 | 95/30 |
| Cl | CH₂=CHCH₂ | H | H | H | H | CH₃ | O | | | | 35/20 | | |
| Cl | C₂H₅ | H | H | H | H | CH₃CH₂CH₂ | S | | | | | | 60/ |
| Cl | CH₃O(CH₂)₃ | H | H | H | H | CH₃CH₂CH₂ | S | 35/ | 25/ | 70/ | 85/15 | /15 | 95/15 |
| Cl | CH₃(CH₂)₃ | H | H | H | H | CH₃ | S | /15 | | | | | |
| Cl | CH₃OCH₂ | CH₃ | H | H | H | CH₃ | S | 40/20 | | | 65/40 | 15/40 | 90/45 |
| Cl | (CH₃)₂CH | CH₃ | H | H | H | CH₃CH₂CH₂ | S | 20/ | 10/ | | 80/50 | 55/ | 90/10 |
| Cl | (CH₃)₂CH | CH₃ | H | H | H | φ | S | 50/20 | 20/ | | 74/80 | 55/55 | 90/75 |
| Cl | (CH₃)₂CH | CH₃ | H | H | H | φ | S | | | | 50/ | 25/ | 50/ |
| Cl | C₂H₅ | H | H | H | H | CH₃ | S | 95/35 | 85/ | 85/ | 100/85 | 100/70 | 100/70 |
| Cl | C₂H₅ | C₂H₅ | H | H | H | CH₃ | S | | | | | | |
| Cl | CH₃O(CH₂)₃ | C₂H₅ | H | H | H | CH₃ | S | | | | 65/ | | |
| Cl | CH₃(CH₂)₃ | C₂H₅ | H | H | H | CH₃ | S | | | | 80/93 | /25 | /65 |
| Cl | (CH₃)₂CH | C₂H₅ | H | H | CH₃ | CH₃ | S | 20/65 | 20/10 | /10 | 95/100 | 65/100 | 95/100 |

* Represents phenyl.

The amount of the triazine administered will vary with the particular plant part or plant growth medium which is to be contacted, the general location of application, i.e., sheltered areas such as greenhouses as compared to exposed areas such as field, as well as the desired type of control. For pre-emergence control of most plants dosages in the range of about 0.5 to 20 lbs. per acre will be used. Such administration will give a concentration of about 2 to 80 p.p.m. triazine distributed throughout 0.1 acre-foot. For post-emergence application, such as foliar spray application, compositions containing about 0.5 to 8 lbs. triazine per 100 gal. spray will be used. Such application is equivalent to about 0.5 to 20 lbs. triazine per acre.

The herbicidal compositions of this invention comprise a herbicidal amount of one or more of the above described triazines intimately admixed with a biologically inert carrier. The carrier may be a liquid diluent such as water or acetone or a solid. The solid may be in the form of dust powder or granules. These compositions will also usually contain adjuvants such as a wetting or dispersing agent to facilitate their penetration into the plant growth media or plant tissue and generally enhance their effectiveness. These compositions may also contain other pesticides, stabilizers, conditioners, fillers and the like.

The triazines of the invention are also useful for the control bacteria and fungi. For example, 2-chloro-4-diethylamino - 6 - (2 - propylcarbamoylthioethylamino)-s-triazine and 2-chloro-4-allylamino-6-(2-propylcarbamoyl-thioethylamino)-s-triazine have been found to be effective for the control of Botrytis cinerea.

As will be evident to those skilled in the art, various modifications on this invention can be made or followed, in the light of the foregoing disclosure and discussion, without departing from the spirit or scope of the disclosure or from the scope of the following claims.

What is claimed is:

1. Compound of the formula

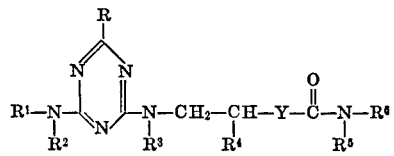

wherein R is chlorine, methoxy or methylthio; R¹ is alkyl or from to 6 carbon atoms, alkenyl of 3 to 6 carbon atoms, or alkoxyalkyl of 2 to 6 carbon atoms; R², R³, R⁴ and R⁵ are hydrogen or alkyl of 1 to 6 carbon atoms; R⁶ is alkyl of 1 to 6 carbon atoms, monocarbocyclic aryl of 6 to 10 carbon atoms substituted with up to 3 (0 to 3) fluorine, chlorine or bromine atoms; and Y is oxygen or sulfur.

2. The compound of Claim 1 wherein R², R³, R⁴ and R⁵ are hydrogen.

3. The compound of Claim 2 wherein R¹ is alkyl.

4. The compound of Claim 2 wherein R¹ is alkoxyalkyl.

5. The compound of Claim 2 wherein R⁶ is alkyl.

6. The compound of Claim 2 wherein R is chlorine, Y is sulfur, R¹ is alkyl or alkoxyalkyl and R⁶ is alkyl.

7. The compound of Claim 6 wherein R¹ is isopropyl and R⁶ is methyl.

8. The compound of Claim 6 wherein R¹ is 3-methoxypropyl and R⁶ is methyl.

9. The compound of Claim 2 wherein R⁶ is phenyl substituted with 1 to 2 fluorine or chlorine atoms.

References Cited

UNITED STATES PATENTS

| 3,261,835 | 7/1966 | Hamm et al. | 260—249.8 |
| 3,347,657 | 10/1967 | Knusli et al. | 260—249.8 X |

FOREIGN PATENTS

| 314,947 | 6/1959 | Great Britain. |
| 314,948 | 6/1959 | Great Britain. |
| 314,949 | 6/1959 | Great Britain. |
| 373,394 | 1/1964 | Switzerland. |
| 2,975 | 10/1968 | Republic of South Africa. |
| 1,914,013 | 10/1969 | West Germany. |

JOHN M. FORD, Primary Examiner

U.S. Cl. X.R.

71—93